June 26, 1934.    L. E. LA BRIE    1,964,163
BRAKE
Filed Oct. 12, 1928    2 Sheets-Sheet 2

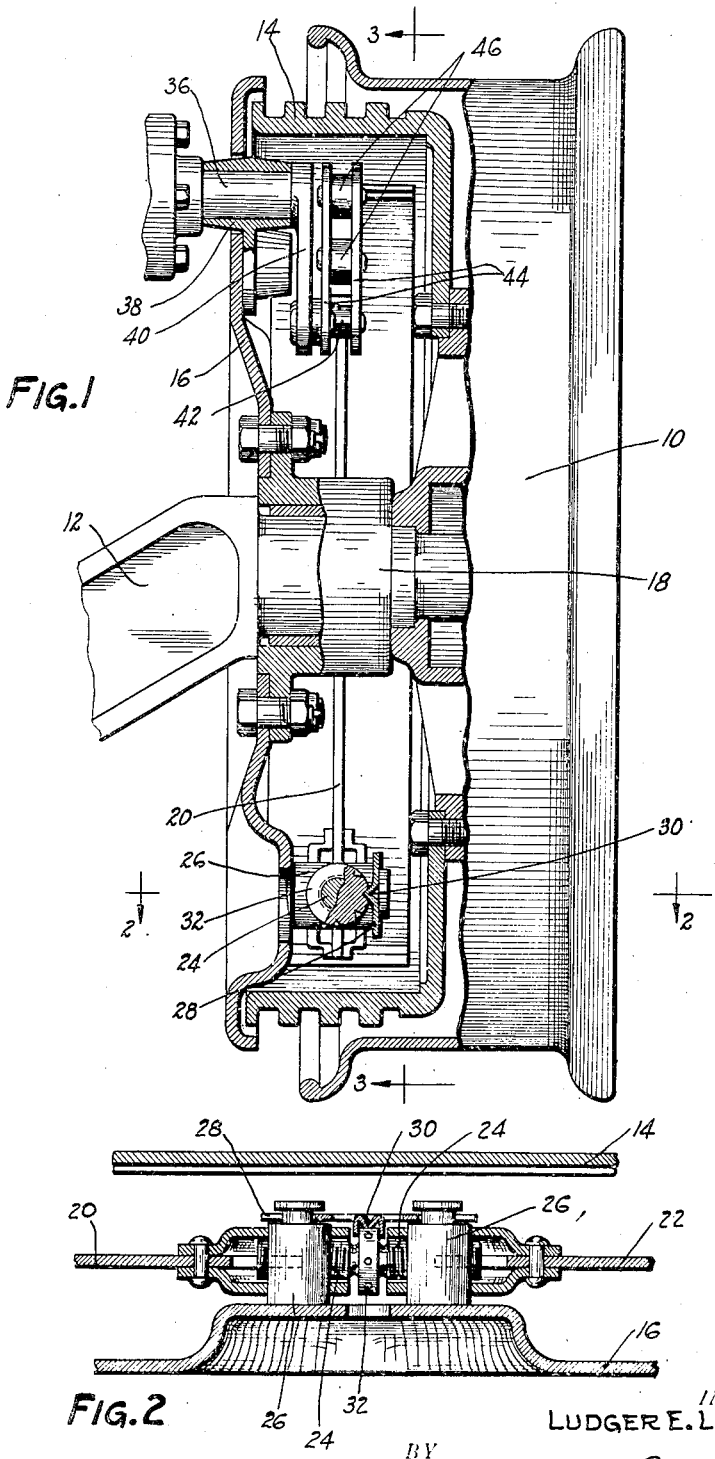

INVENTOR
LUDGER E. LA BRIE
BY
ATTORNEY

Patented June 26, 1934

1,964,163

UNITED STATES PATENT OFFICE 1,964,163

BRAKE

Ludger E. La Brie, South Bend, Ind., assignor to Bendix Brake Company, South Bend, Ind., a corporation of Illinois Application October 12, 1928, Serial No. 312,115

13 Claims. (Cl. 188—78)

This invention relates to brakes, especially of the heavy-duty type, and is illustrated as embodied in an internal expanding brake for one of the wheels of the mount of an anti-aircraft gun. The present application has to do with certain improved modifications in a brake of the type covered by my prior applications Nos. 304,196, filed September 6, 1928, and 310,836, filed October 6, 1928, more particularly as to the brake anchorage.

An object of the invention is to provide an anchor having a movable part and means for retaining the part against displacement.

Another object of the invention is to provide an anchor supporting a plano-convex thrust member with means on the anchor for retaining the thrust member in position.

Other objects of the invention will be apparent from the following description of the illustrative embodiment shown in the accompanying drawings, in which:

Figure 1 is a rear elevation of the right wheel and its brake, partly broken away to show the brake in transverse vertical section;

Figure 2 is a partial section on the line 2—2 of Figures 1 and 3, showing the brake adjustment;

Figure 3:
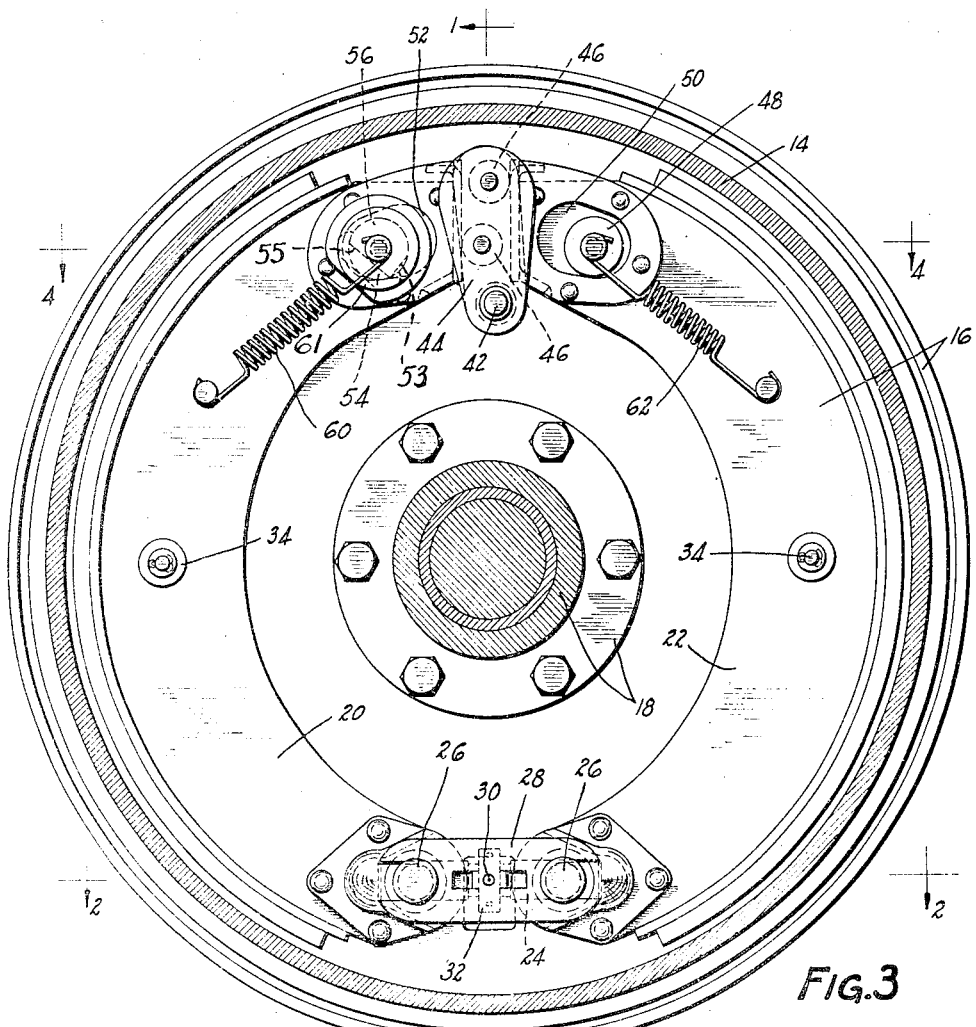
Figure 3 is a vertical section on the line 3—3 of Figure 1, just inside the head of the brake drum, and showing the brake shoes in side elevation.

The illustrated brake is intended for use on a wheel 10 rotatably journaled on the axle 12. The wheel supports a ribbed drum 14. At the open side of the drum 14 is a fixed support such as a backing plate 16 bolted or otherwise secured to a flanged member 18 suitably secured on the axle 12.

The friction means of the brake preferably includes a pair of shoes 20 and 22, faced with the usual friction lining, and connected by an expansible or adjustable joint including a right-and-left threaded member 24 threaded into transverse pivots 26 mounted in the ends of the shoes. Pivots 26 are flattened on their inner ends for slidable engagement with the backing plate, and at their drum ends are grooved to receive the forked ends of a resilient locking plate 28 having a tooth 30 yieldingly interlocking with radial sockets in a circumferential flange 32 on member 24.

Shoes 20 and 22 may be provided at their centers with suitable steady-rests 34.

The brake is applied by means such as a crank-shaft 36 journaled in a supporting bracket 38 carried by the backing plate, and having a crank arm 40 connected at its end by a pivot 42 to a floating cam lever including plates 44 having thrust rollers 46 pivoted between them and engaging the adjacent shoe ends.

In order to provide suitable anchorage for the brake shoes during braking action, anchors 48 and 56 are provided.

The right-hand anchorage, as viewed in Figure 3 of the drawings, which comes into operation upon counterclockwise rotation of the drum 14, comprises a fixed cylindrical pivot 48 mounted on the bracket 38 which pivot passes through an elongated slot 50 in the web 22 of the right-hand shoe. The left-hand anchorage which comes into operation upon clockwise rotation of the brake drum, comprises a fixed pivot 56, mounted upon the bracket 38, which pivot has a cylindrical surface, with two flattened sides 53 and 55 as illustrated. The left-hand shoe flange 20 likewise is provided with a slot 52 through which the fixed pivot 56 passes.

To allow for radial movement of the left-hand shoe upon its pin the broader flattened surface 55, whose plane extends substantially radial is provided with a plano convex thrust member 54, the curved surface of which engages the curvature of the slot 52, and the flat surface of which is free to slide upon the broad flat surface 55.

Figure 4:
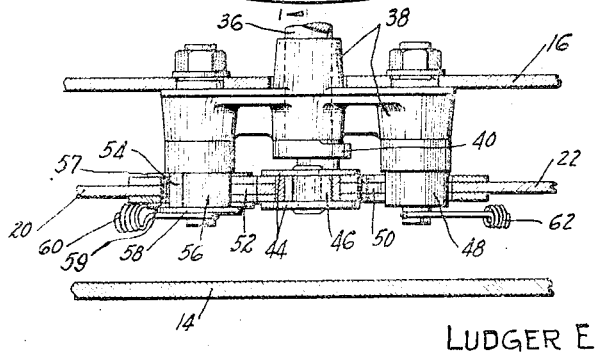
Figure 4 is a partial section on the line 4—4 of Figure 3, showing the brake-applying means.

As may be readily seen in Figure 4, the thrust member 54 is of greater length than the width of the reinforced brake shoe web, and is of substantially the same length as the reduced cylindrical and flattened portion of the anchor pivot 56. To properly constrain the thrust member 54, washers 57 and 59 are provided, which washers have a bore adapted to fit the pivot 56 about its cylindrical portion and the narrow flattened portion 53, to prevent rotation. The portion of the bore of the washers which takes a position opposite the broad flat surface 55 of the pivot 56 is cut away as shown at 61, Figure 3, in dotted lines so as to form a straight or flat edge parallel to the broad flat surface of the anchor pivot 56 at a distance therefrom equal to the thickness of the thrust member. Such a configuration permits sliding movement of the thrust member, and yet constrains the same from slipping out of place. An end washer 58 is provided in order to prevent axial movement of the thrust member, which washer is in turn retained by the hook of a return spring 60 secured in a grooved extension projecting from the end of the anchor 56. A second return spring 62 is provided similarly upon anchor 48 and shoe 22.

In operation during counterclockwise rotation of the drum, upon rotation of the crankshaft 36, the crank 40 carries the cam lever 44 to the left thus spreading the ends of the brake shoes. Upon engagement of the shoes with the brake drum, a torque is transmitted to the shoes which causes the shoes to rotate counterclockwise. Such rotation of the brake shoes may continue until prevented by the engagement of the right-hand end of slot 50 upon the pin 48. Upon clockwise rotation the action is similar except that the clockwise rotation of the brake shoes is arrested by the left-hand anchor, thrust member and slot 52. Upon brake application clockwise rotation tends to rotate the shoes clockwise and hence increase the angle of the actuating cam lever, thus increasing the braking action.

It is not my intention to claim in this application any subject-matter disclosed in my two above-identified prior applications, but on the other hand it is not my intention to limit the scope of the invention to the exact embodiment described above, or otherwise than by the terms of the appended claims.

I claim:

1. A brake comprising, in combination, a pair of anchors, at least one of which has a radially slidable part, a friction device anchoring against said anchors at its ends, and a pair of springs tensioned between each anchor and the friction device a short distance from the corresponding end of the friction device the aforementioned slidable part being secured in position by one end of one of said springs.

2. A brake anchor having a slidable part, a washer mounted on the anchor and holding said part, and a brake return spring attached to the anchor and holding the washer.

3. A brake anchor having a recessed spring-attaching projection at its end.

4. A brake comprising an anchor, a brake shoe, having a slot through which said anchor passes, a part slidable transversely on said anchor, and means retaining the part against axial movement.

5. A brake comprising an anchor, a brake shoe, having a slot through which said anchor passes, a thrust member movable transversely on said anchor, and means for retaining the thrust member against axial movement.

6. A brake comprising an anchor, a plano-convex thrust member movable transversely on the anchor, a washer on the end of the anchor retaining the thrust member against axial movement, and means securing the washer against displacement.

7. A brake comprising an anchor having a flat, and a circumferential groove, a thrust member slidable transversely on the flat, a washer on the anchor retaining the thrust member against axial movement, and a spring clip in the circumferential groove retaining the washer against displacement.

8. A brake comprising a brake shoe, an anchor for said brake shoe, a part slidable transversely on said anchor, and a spring urging said part toward the anchor and acting to retain said part in close sliding engagement with said anchor.

9. A brake comprising an anchor, a thrust member slidable radially upon said anchor, and washers on said anchor at opposite ends of the thrust member retaining said thrust member in operative position with respect to said anchor.

10. A brake comprising a brake shoe, an anchor, a part slidable transversely on said anchor and adapted to bear on said shoe, and means engaging the ends of said part to retain said part in operative position.

11. A brake comprising an anchor, a thrust member slidable radially on said anchor, means to prevent axial sliding of said thrust member, and means yieldingly urging said member toward the anchor to retain said member in operative position.

12. A brake comprising an anchor, having two flat sides, a thrust member slidable on one of said flat sides, and means to retain said thrust member in operative position, keyed against rotation by said other flat side.

13. A brake comprising an anchor, having a flat side, a thrust member slidable thereon, means to retain said thrust member in operative position, and cooperative means on said anchor and said first named means for preventing movement of said first named means with respect to said anchor.

LUDGER E. LA BRIE.